T. W. McKENZIE.
STEERING WHEEL FOR MOTOR CARS.
APPLICATION FILED JULY 18, 1913.
1,104,524.
Patented July 21, 1914.
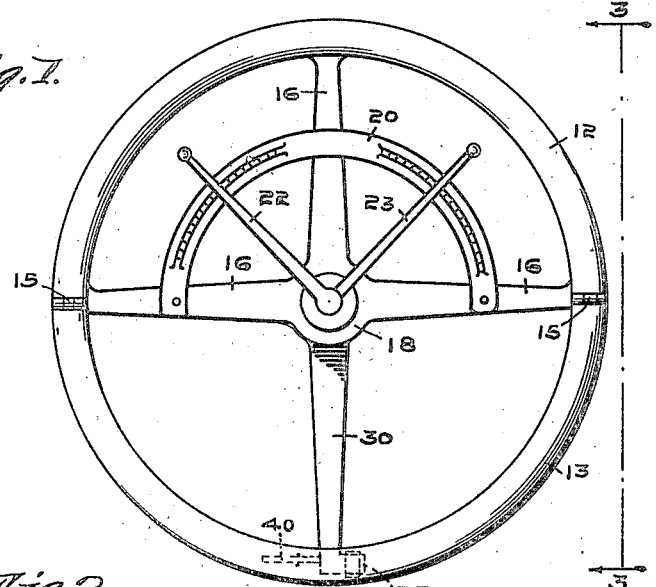
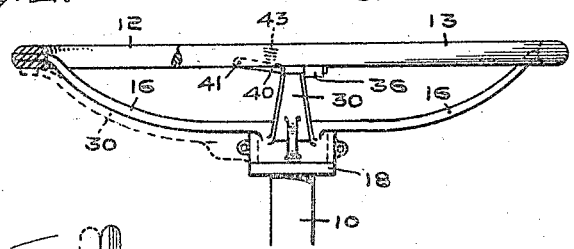
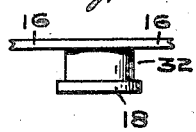
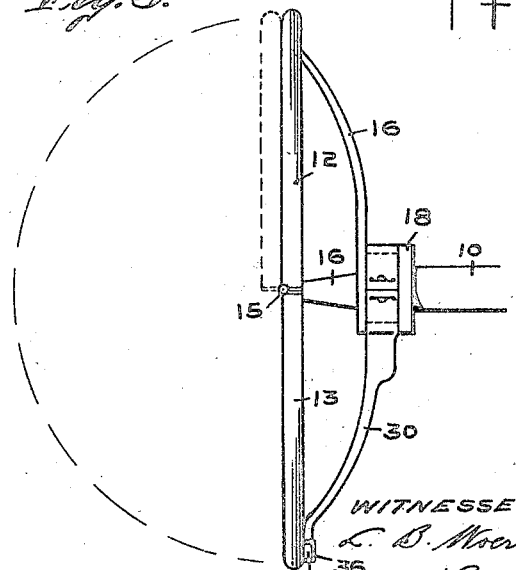
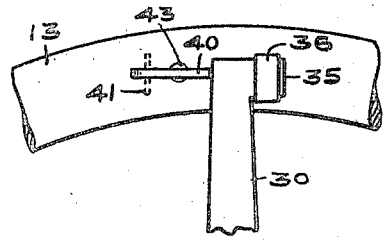
INVENTOR
Thomas W. McKenzie,
By Winter & Woerner
ATTORNEYS.
WITNESSES:
L. B. Woerner
J. H. Swan.

UNITED STATES PATENT OFFICE.

THOMAS W. McKENZIE, OF INDIANAPOLIS, INDIANA, ASSIGNOR OF ONE-THIRD TO JOSEPH LAULER AND ONE-THIRD TO CHARLES OEFTERING, BOTH OF INDIANAPOLIS, INDIANA.

STEERING-WHEEL FOR MOTOR-CARS.

1,104,524.      Specification of Letters Patent.      Patented July 21, 1914.

Application filed July 18, 1913. Serial No. 779,809.

*To all whom it may concern:*

Be it known that I, THOMAS W. MCKENZIE, a citizen of the United States, residing at Indianapolis, in the county of Marion and State of Indiana, have invented certain new and useful Improvements in Steering-Wheels for Motor-Cars, of which the following is a specification.

This invention relates to steering wheels used in connection with the steering mechanism of motor and similar vehicles. The proposed steering wheel is transversely divided into two equal parts, in which one of the semi-circular sections of the wheel is rigidly secured to the steering shaft and the other section being hinged to the fixed section and may be raised and folded back upon the fixed section so that additional room is provided between the periphery of the steering wheel and the seat, to more readily admit free and easy passage for the driver to and from the driver's seat.

The object of the invention consists in the provision of a steering wheel of the above character wherein through the folding of said wheel additional room is provided for more easily getting in and out of the driver's seat than now obtains when the steering wheels of the old and well-known types are employed.

I accomplish the above object of the invention by means of the steering wheel illustrated in the accompanying drawings, forming a part hereof, in which—

Figure 1 is a top or plan view of my improved steering wheel for motor vehicles. Fig. 2 is a view partly in side elevation and partly in section of the construction shown in Fig. 1. Fig. 3 is a side view of the construction as shown when looking in the direction of the arrows on the dotted line 3—3 in Fig. 1. Fig. 4 is a fragmentary detail view, on an enlarged scale, of the under side of the steering wheel showing the connection between the movable section of the wheel and the movable spoke. Fig. 5 is a side elevation of the hub 18, the surrounding parts of the steering wheel being broken away.

Referring to the drawings, 10 represents the steering shaft, commonly in use in motor vehicles. To the upper end of the steering shaft 10 I secure the steering wheel which is composed of a fixed section 12 and a hinged section 13, the latter section being hinged to the former by means of suitable hinges 15. The fixed section 12 is provided with three integrally formed spokes 16 which terminate in a hub 18, said hub being rigidly secured in a suitable manner to the upper end of the steering shaft 10, so that said steering shaft may be rotated back and forth in the usual manner. The spokes 16 form the means for securing the usual segmental semi-circular rack 20 which provide means for holding the spark control lever 22 and the throttle control lever 23 in desired positions.

When the hinged section 13 is lowered to bring it into the same plane with the section 12, as shown in Fig. 3 of the drawings, I provide means for supporting the outer edge of said movable section so that the two sections of the wheel will be held in rigid relation and will prevent independent vibratory movement between said two sections. To accomplish this result I provide a spoke 30 which is fitted into a circumferential groove 32 in the hub 18. See Fig. 5. The spoke 30 is susceptible of rotary movement around the hub 18 and steering shaft 10 so that said spoke 30 may be moved in a position to lie beneath one of the spokes 16 when it is desired to raise the section 13 of the steering wheel. This is of vital importance for the reason that if the spoke 30 was allowed to retain the position occupied while the wheel is in operative position there would be no advantage in raising the section 13 to reduce the diameter of the steering wheel, from the fact that the additional room desired between the steering shaft and the driver's seat would not result.

In order to hold the hinged section 13 of the steering wheel and the movable spoke 30 in secure operative relation the free end of the spoke 30 is bent at right angles to form a hook 35 adapted to engage a correspondingly shaped loop 36 securely fixed to the under side surface of the hinged section 13 of the steering wheel. The hook 35 fits snugly into the loop 36 so as to prevent a displacement of the parts through vibration. In case it is desired to employ a stop to prevent accidental displacement of the spoke 30 from the loop 36 a pivoted bar 40 may be employed. This bar is centrally pivoted at 41 to the hinged section 13, and a spring 43 may be employed to exert a tension against the bar to hold the end adjacent to the spoke 30 constantly into contact with the face of the hinged section 13. When it is desired to release the spoke 30 the bar 40 is depressed until it disappears beneath the surface of the hinged section 13, at which time the spoke 30 may be freely moved around the hub 18 to disengage the hook 35 from the loop 36.

While I have described my invention with more or less minuteness, as regards details of construction and arrangement, and as being embodied in certain precise forms, I do not desire to be limited thereto unduly or any more than is pointed out in the claims. On the contrary, I contemplate all proper changes in form, construction and arrangement, the omission of immaterial elements, and the substitution of equivalents as circumstances may suggest or necessity render expedient.

Having thus fully described my said invention, what I desire to secure by Letters Patent, is—

1. A steering wheel of the above specified class, comprising a fixed and a hinged section, means for hingedly securing the hinged section to the fixed section, a hub for the fixed section for securing the latter to the steering shaft, said hub being provided with a circumferentially disposed groove, a movable spoke adapted to ride in said groove and susceptible to oscillatory travel about said hub and wheel, to bring said spoke beneath and to support the hinged section in operative position.

2. A steering wheel of the above specified class, comprising a fixed and a hinged section, means for hingedly securing the hinged section to the fixed section, a hub for the fixed section for securing the latter to the steering shaft, said hub being provided with a circumferentially disposed groove, a movable spoke adapted to ride in said groove and susceptible to oscillatory travel about said hub and wheel, to bring said spoke beneath and to support the hinged section in operative position, a hook formed on the free end of said movable spoke, and means on the hinged section of the wheel to take over said hook.

3. A steering wheel of the above specified class, comprising a fixed and a hinged section, means for hingedly securing the hinged section to the fixed section, a hub for the fixed section for securing the latter to the steering shaft, said hub being provided with a circumferentially disposed groove, a movable spoke adapted to ride in said groove and susceptible to oscillatory travel about said hub and wheel, to bring said spoke beneath and to support the hinged section in operative position, a hook formed on the free end of said movable spoke, means on the hinged section of the wheel to take over said hook, and means for preventing accidental displacement of said hook from said preceding means.

In witness whereof, I have hereunto set my hand and seal at Indianapolis, Indiana, this 2nd day of July, A. D. one thousand nine hundred and thirteen.

THOMAS W. McKENZIE. [L. S.]

Witnesses:
F. W. WOERNER,
L. B. WOERNER.